United States Patent
Higa et al.

(10) Patent No.: US 11,373,285 B2
(45) Date of Patent: Jun. 28, 2022

(54) IMAGE GENERATION DEVICE, IMAGE GENERATION METHOD, AND IMAGE GENERATION PROGRAM

(71) Applicant: NEC CORPORATION, Tokyo (JP)

(72) Inventors: Kyota Higa, Tokyo (JP); Azusa Sawada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/982,871

(22) PCT Filed: Mar. 22, 2018

(86) PCT No.: PCT/JP2018/011367
§ 371 (c)(1),
(2) Date: Sep. 21, 2020

(87) PCT Pub. No.: WO2019/180868
PCT Pub. Date: Sep. 26, 2019

(65) Prior Publication Data
US 2021/0056675 A1 Feb. 25, 2021

(51) Int. Cl.
*G06K 9/00* (2022.01)
*G06T 7/00* (2017.01)

(52) U.S. Cl.
CPC .. *G06T 7/0002* (2013.01); *G06T 2207/30168* (2013.01)

(58) Field of Classification Search
CPC .............. G06T 7/0002; G06T 2207/30168
(Continued)

(56) References Cited

U.S. PATENT DOCUMENTS 10,540,578 B2 * 1/2020 Madani ................ G06K 9/6256
10,592,779 B2 * 3/2020 Madani ................ G06N 3/0481
(Continued)

FOREIGN PATENT DOCUMENTS

JP 2011-214903 A 10/2011

OTHER PUBLICATIONS

Zhang, Xinming, et al. "Seggan: Semantic segmentation with generative adversarial network." 2018 IEEE Fourth International Conference on Multimedia Big Data (BigMM). IEEE, 2018. (Year: 2018).*
(Continued)

*Primary Examiner* — Jonathan S Lee

(57) ABSTRACT

An image generation means 81 generates an image using a generator. A discrimination means 82 discriminates whether an object image includes a feature of a target image, using a discriminator. A first update means 83 updates the generator so as to minimize a first error representing a degree of divergence between a result of discriminating a generated image using the discriminator and a correct answer label associated with the generated image, the generated image being the image generated using the generator. A second update means 84 updates the discriminator so as to minimize a second error representing a degree of divergence between each of respective results of discriminating the generated image, a first actual image including the feature of the target image, and a second actual image not including the feature of the target image using the discriminator and a correct answer label associated with a corresponding image.

6 Claims, 6 Drawing Sheets

(58) Field of Classification Search
USPC .......................................................... 382/141
See application file for complete search history.

(56) References Cited

U.S. PATENT DOCUMENTS

| | | | |
|---|---|---|---|
| 10,937,540 B2* | 3/2021 | Madani | G16H 50/50 |
| 2018/0260957 A1* | 9/2018 | Yang | G06T 7/143 |
| 2019/0147320 A1* | 5/2019 | Mattyus | G06V 10/82 |
| | | | 382/155 |
| 2019/0197358 A1* | 6/2019 | Madani | G06N 3/0481 |
| 2019/0197368 A1* | 6/2019 | Madani | G06K 9/627 |
| 2019/0198156 A1* | 6/2019 | Madani | G06N 3/0472 |

OTHER PUBLICATIONS

Shi, Qian, Xiaoping Liu, and Xia Li. "Road detection from remote sensing images by generative adversarial networks." IEEE access 6 (2017): 25486-25494. (Year: 2017).*

Xue, Yuan, et al. "SegAN: adversarial network with multi-scale L1 loss for medical image segmentation." Neuroinformatics 16.3 (2018): 383-392. (Year: 2018).*

Yang, Dong, et al. "Automatic liver segmentation using an adversarial image-to-image network." International conference on medical image computing and computer-assisted intervention. Springer, Cham, 2017. (Year: 2017).*

Toshihiro Takahashi, "Families of GANs", IEICE Technical Report, Pattern Recognition and Media Understanding, The Institute of Electronics, Information and Communication Engineers, vol. 117, No. 238, PRMU 2017-63 to PRMU 2017-100, Oct. 2017, pp. 95-100, ISSN 0913-5685.

Alec Radford, et al., "Unsupervised Representation Learning with Deep Convolutional Generative Adversarial Networks", Under Review as a Conference Paper at ICLR 2016, 2016, pp. 1-16.

Hidemasa Ito, et al., "Deep learning data augmentation technique to improve image recognition accuracy" Toshiba Review, vol. 72, No. 4, Sep. 2017, pp. 18-21, ISSN 2432-1168.

International Search Report for PCT/JP2018/011367 dated Jun. 19, 2018 [PCT/ISA/210].

Written Opinion for PCT/JP2018/011367 dated Jun. 19, 2018 [PCT/ISA/237].

* cited by examiner

IMAGE GENERATION DEVICE, IMAGE GENERATION METHOD, AND IMAGE GENERATION PROGRAM

CROSS REFERENCE TO RELATED APPLICATIONS

This application is a National Stage of International Application No. PCT/JP2018/011367 filed Mar. 22, 2018.

TECHNICAL FIELD

The present invention relates to an image generation device, an image generation method, and an image generation program for generating a learning image including a desired feature.

BACKGROUND ART

As the labor population is declining, demand to support or automate, using image recognition technology, determination on normality/abnormality by skilled maintenance workers conducting examination, inspection, etc. is growing. In image recognition, a large number of learning images collected on site need to be used to improve recognition accuracy. However, since abnormal states usually do not occur frequently, it is difficult to collect a sufficient number of learning images.

In view of this, various methods of learning models from a small amount of data are proposed. For example, a generative adversarial network (GAN) is a model that learns training data and generates new data similar to the training data. There is also a known method (e.g. stacked autoencoder) of learning a model using only normal data and determining that an object is abnormal in the case where the similarity between input and output is low.

Patent Literature (PTL) 1 describes a visual inspection discriminator generation device that enables learning of a discriminator for discriminating whether an inspection object is a non-defective item even in the case where only a small number of images showing defects in defective items of inspection objects can be obtained. The device described in PTL 1 acquires, for each of a plurality of pseudo-defect images each of which represent in a pseudo manner an images of a defect that occurs at the surface of an inspection object, defectiveness determination information indicating whether the image of the defect on the pseudo-defect image corresponds to a non-defective item or a defective item of the inspection object. The device described in PTL 1 determines, from the defectiveness determination information corresponding to the plurality of pseudo-defect images, a boundary for discriminating non-defective items and defective items of inspection objects, and generates a plurality of learning samples each of which is a combination of a feature value of an image of a defect and a value representing a defectiveness determination result of an inspection object for the feature value determined based on the boundary.

Non Patent Literature (NPL) 1 describes a method (deep convolutional generative adversarial network (DCGAN)) of generating an image by machine learning. The method described in NPL 1 generates a photograph-quality image from random noise by applying a convolutional network to an existing GAN.

CITATION LIST

Patent Literature

PTL 1: Japanese Patent Application Laid-Open No. 2011-214903

Non Patent Literature

NPL 1: Alec Radford, Luke Metz, Soumith Chintala, "Unsupervised Representation Learning with Deep Convolutional Generative Adversarial Networks", ICLR 2016

SUMMARY OF INVENTION

Technical Problem

In some image recognition objects, a specific feature is sufficiently small as compared with the whole region. For example, a power line arc trace (lightning trace) represents an abnormal state, but is a feature present in a small range as compared with the range of the whole power line. That is, most of the region of an image including the abnormal part is a normal region. Hence, for example, even when trying to generate an image representing the abnormal state using the method described in NPL 1, the specific feature is buried in the whole image. It is thus difficult to generate an image that contributes to improved image recognition accuracy. The same problem can be seen in the case of generating the pseudo-defect image described in NPL 1.

The present invention therefore has an object of providing an image generation device, an image generation method, and an image generation program capable of generating a learning image that improves image recognition accuracy.

Solution to Problem

An image generation device according to the present invention includes: an image generation means for generating an image using a generator; a discrimination means for discriminating whether an object image includes a feature of a target image, using a discriminator; a first update means for updating the generator so as to minimize a first error representing a degree of divergence between a result of discriminating a generated image using the discriminator and a correct answer label associated with the generated image, the generated image being the image generated using the generator; and a second update means for updating the discriminator so as to minimize a second error representing a degree of divergence between each of respective results of discriminating the generated image, a first actual image including the feature of the target image, and a second actual image not including the feature of the target image using the discriminator and a correct answer label associated with a corresponding image.

An image generation method according to the present invention includes: generating an image using a generator; discriminating whether an object image includes a feature of a target image, using a discriminator; updating the generator so as to minimize a first error representing a degree of divergence between a result of discriminating a generated image using the discriminator and a correct answer label associated with the generated image, the generated image being the image generated using the generator; and updating the discriminator so as to minimize a second error representing a degree of divergence between each of respective results of discriminating the generated image, a first actual image including the feature of the target image, and a second actual image not including the feature of the target image using the discriminator and a correct answer label associated with a corresponding image.

An image generation program according to the present invention causes a computer to execute: an image generation process of generating an image using a generator; a discrimination process of discriminating whether an object image includes a feature of a target image, using a discriminator; a first update process of updating the generator so as to minimize a first error representing a degree of divergence between a result of discriminating a generated image using the discriminator and a correct answer label associated with the generated image, the generated image being the image generated using the generator; and a second update process of updating the discriminator so as to minimize a second error representing a degree of divergence between each of respective results of discriminating the generated image, a first actual image including the feature of the target image, and a second actual image not including the feature of the target image using the discriminator and a correct answer label associated with a corresponding image.

Advantageous Effects of Invention

According to the present invention, it is possible to generate a learning image that improves image recognition accuracy.

DESCRIPTION OF EMBODIMENT

An exemplary embodiment of the present invention will be described below, with reference to the drawings. An image generation device according to the present invention generates an image (hereafter referred to as "target image") which a user wants to use as a learning image. In other words, the target image is an image having a feature desired by the user, and can be regarded as an image which the user wants to generate. In the foregoing example of the power line, the power line arc trace (lightning trace) is such a feature.

The image generation device according to the present invention is suitable for use in the case of generating a learning image in a situation in which the number of learning images including the feature described above is small and an image not including the feature tends to be generated (i.e. there is high possibility that the feature is buried (hidden)). In the foregoing example of the power line arc trace (lightning trace), the power line arc trace (lightning trace) is a feature present in a small range as compared with the range of the whole power line. Accordingly, even when trying to generate an abnormality image including the power line arc trace (lightning trace) by a typical method, an image (i.e. normality image) not including the feature tends to be generated. The image generation device according to the present invention generates a learning image including such a feature.

Figure 1:
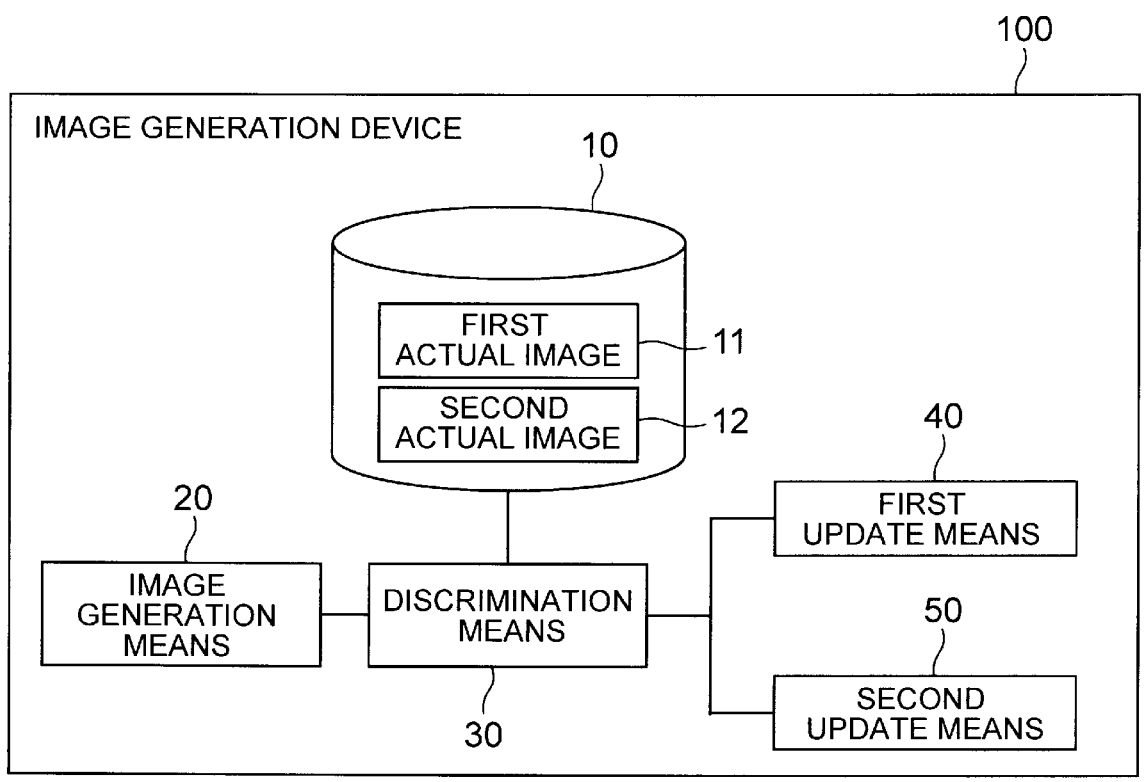
FIG. 1 is a block diagram depicting an example of a structure of an exemplary embodiment of an image generation device according to the present invention.

FIG. 1 is a block diagram depicting an example of a structure of an exemplary embodiment of an image generation device according to the present invention. An image generation device 100 according to this exemplary embodiment includes a storage unit 10, an image generation means 20, a discrimination means 30, a first update means 40, and a second update means 50.

The storage unit 10 stores images discriminated by the below-described discrimination means 30. Specifically, the storage unit 10 stores an image 11 (hereafter referred to as "first actual image") including a feature of a target image and an image 12 (hereafter referred to as "second actual image") not including the feature of the target image. That is, the first actual image can be regarded as the target image. The first actual image and the second actual image are stored in the storage unit 10 by the user or the like beforehand.

The image generation means 20 generates an image using a generator. In the following description, the image generated by the image generation means 20 (generator) is also referred to as "generated image". The generator is realized by any model capable of generating images. An example is a neural network. The generator (e.g. parameters, etc.) is sequentially updated by the below-described first update means 40. The following will describe an example in which the generator is realized by a neural network.

For example, the image generation means 20 may generate an image from a given random number, or generate a new image from a reference image. Methods of generating new images from random numbers or reference images are widely known, and accordingly their detailed description is omitted here. The image generation means 20 outputs the generated image to the discrimination means 30.

The discrimination means 30 discriminates whether an image as an object of discrimination (object image) includes the feature of the target image. In this exemplary embodiment, the discrimination means 30 discriminates the image using a discriminator. The discriminator is realized by any model capable of classifying object images into two or more types, such as a binary classifier or a multinomial classifier. An example is a neural network. The discriminator (e.g. parameters, etc.) is sequentially updated by the below-described second update means 50. The following will describe an example in which the discriminator is realized by a neural network.

The image to be discriminated by the discrimination means 30 includes not only the generated image but also the first and second actual images stored in the storage unit 10. The discrimination means 30 outputs a correct answer label corresponding to the object image, together with the discrimination result of the object image.

Here, the discrimination means 30 outputs each of a correct answer label used to update the generator and a correct answer label used to update the discriminator. Hereafter, the correct answer label used to update the generator is referred to as "first output set", and the correct answer label used to update the discriminator is referred to as "second output set".

In the case where the discrimination object is the generated image, the discrimination means 30 outputs, as the first output set, the result of discriminating the generated image and a correct answer label indicating that the generated image is the target image.

In the case where the discrimination object is the generated image, the discrimination means 30 outputs, as the second output set, the result of discriminating the generated image and a correct answer label indicating that the generated image is not the target image. In the case where the discrimination object is the first actual image, the discrimination means 30 outputs the result of discriminating the first actual image and a correct answer label indicating that the first actual image is the target image. In the case where the discrimination object is the second actual image, the discrimination means 30 outputs the result of discriminating the second actual image and a correct answer label indicating that the second actual image is not the target image.

The reason for outputting such correct answer labels is as follows.

It is desirable for the generator to generate such a generated image that is discriminated by the discriminator as the target image. The generator therefore needs learning data such as the foregoing first output set. Meanwhile, it is desirable for the discriminator to discriminate the first actual image as the target image and the second actual image not as the target image. The discriminator therefore needs learning data in which, for the first actual image, a correct answer label indicating that the image is the target image is set, and for the second actual image, a correct answer label indicating that the image is not the target image is set.

Moreover, in this exemplary embodiment, an objective is to cause the generator to generate an image including the feature of the target image. Hence, for the discriminator, learning data in which the generated image is associated with the correct answer label indicating that the generated image is not the target image is prepared. Thus, learning data for generating an image such as the first actual image can be provided to the generator. In other words, by preparing such learning data, the generator can be prevented from generating an image such as the second actual image.

In the following description, the result of discrimination that the image is the target image is expressed as "1", and the result of discrimination that the image is not the target image is expressed as "0". Moreover, the correct answer label indicating that the image is not the target image is expressed as "0", and the correct answer label indicating that the image is the target image is expressed as "1". Each correct answer label is, however, not limited to binary expression of 0 or 1. For example, the likelihood of the target image may be expressed as a value from 0 to 1.

Figure 2:
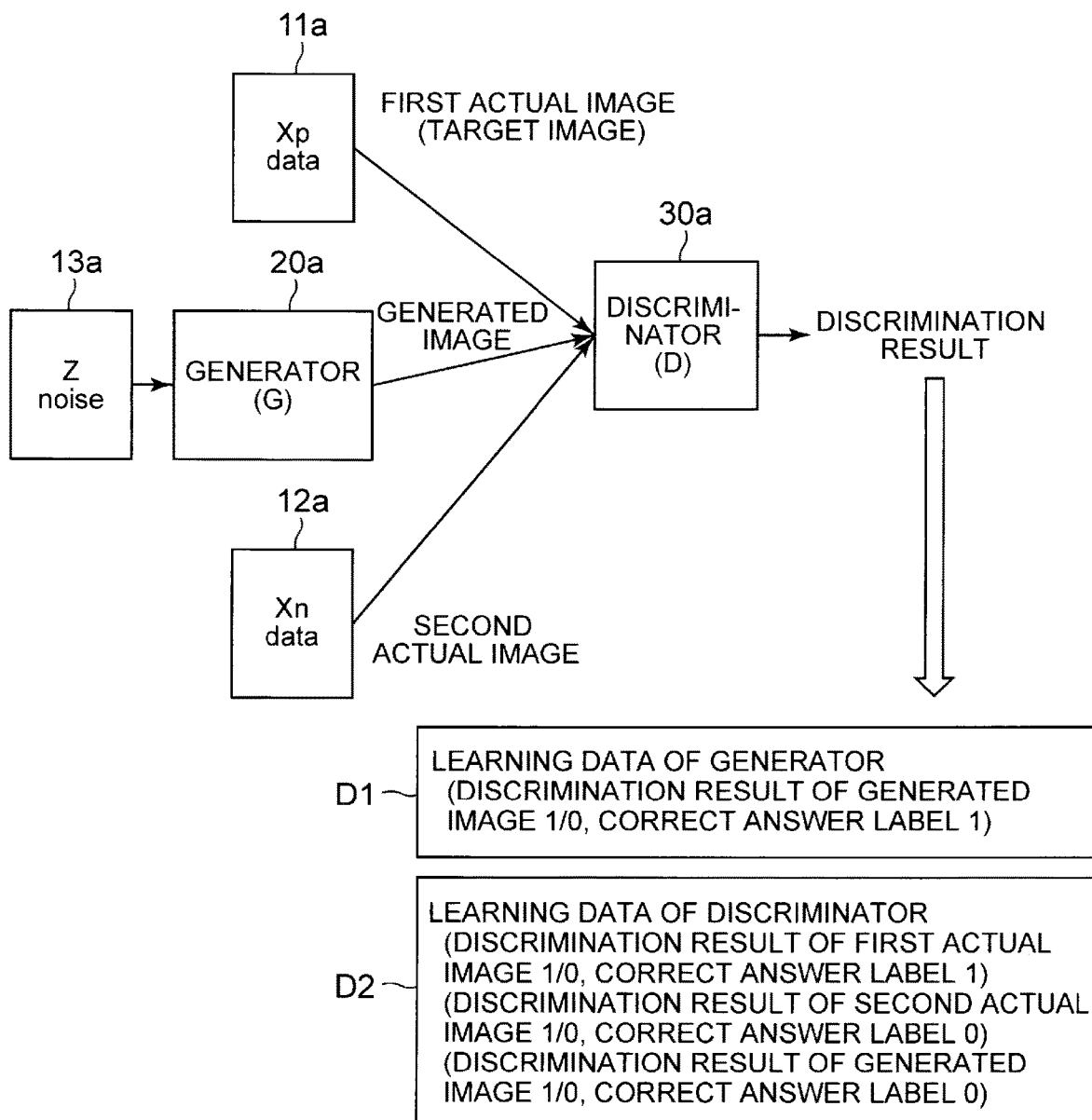
FIG. 2 is an explanatory diagram depicting an example of operation of outputting learning data.

FIG. 2 is an explanatory diagram depicting an example of operation of outputting learning data. The image generation means 20 generates a generated image based on noise 13a, using a generator 20a. The discrimination means 30 discriminates the generated image, a first actual image 11a, and a second actual image 12a, using a discriminator 30a. The discrimination means 30 outputs, as learning data D1 of the generator 20a (i.e. first output set), learning data associating the discrimination result (1 or 0) of the generated image with the correct answer label "1". The discrimination means 30 also outputs, as learning data D2 of the discriminator 30a (i.e. second output set), learning data associating the discrimination result (1 or 0) of the first actual image with the correct answer label "1", learning data associating the discrimination result (1 or 0) of the second actual image with the correct answer label "0", and learning data associating the discrimination result (1 or 0) of the generated image with the correct answer label "0".

The first update means 40 updates the generator used by the image generation means 20 when generating an image. Specifically, the first update means 40 updates the generator so as to minimize an error (hereafter referred to as "first error") representing the degree of divergence between the result of discriminating the generated image using the discriminator and the correct answer label associated with the generated image.

The first output set is used to update the generator. That is, the discrimination means 30 outputs the result of discriminating the generated image and the correct answer label indicating that the generated image is the target image, as the learning data for updating the generator. The first update means 40 updates the generator so as to minimize the first error representing the degree of divergence between the result of discriminating the generated image and the correct answer label indicating that the generated image is the target image.

For example, in the case where the discrimination result of the generated image is the value "1" representing that the generated image is the target image, the degree of divergence from the correct answer label "1" indicating that the generated image is the target image is 0. In the case where the discrimination result of the generated image is the value "0" representing that the generated image is not the target image, on the other hand, the degree of divergence from the correct answer label "1" indicating that the generated image is the target image is 1. The first update means 40 updates the generator so as to minimize this degree of divergence (error).

The method of updating the generator is determined depending on the generator used. For example, in the case where the generator is a neural network, the first update means 40 may learn such parameters that minimize the degree of divergence using, as learning data, the first output set output from the discrimination means 30.

For example, in the case where a loss function E is defined by the following Formula 1, the first update means 40 may optimize the parameters of the generator so as to minimize the loss function E. The loss function E described below is an example, and any method with which the parameters of the generator can be optimized may be used.

[Math. 1]

$$E = -\sum_{n=1}^{N} \sum_{k'=1}^{K} t_{k'n} \log P_{k'}(x_n).$$

(Formula 1)

In Formula 1, N denotes the number of pieces of data, and K denotes the number of classes for classification. In Formula 1, $t_{k'n}$ is a vector of a correct answer label for nth input data, and is expressed in the form of the following Formula 2. The vector indicated in Formula 2 as an example is 1-of-k vectors in which only the kth element represents 1.

$$t_n = (0, \ldots, 0, 1, 0, \ldots, 0)$$

(Formula 2).

In Formula 1, $P_{k'}(x_n)$ indicates the probability of the nth input data belonging to a class k'. $P_{k'}(x_n)$ is calculated according to the following Formula 3.

[Math. 2]

$$P_k(x_n) = \frac{e^{f_k(x_n)}}{\sum_{k'=1}^{K} e^{f_{k'}(x_n)}}. \quad \text{(Formula 3)}$$

In Formula 3, $f_k(x_n)$ is an output value of a class k for nth input data $x_n$, and indicates the probability of $x_n$ belonging to the class k.

The second update means 50 updates the discriminator used by the discrimination means 30 when discriminating an image. Specifically, the second update means 50 updates the discriminator so as to minimize an error (hereafter referred to as "second error") representing the degree of divergence between each of the respective results of discriminating the generated image, the first actual image, and the second actual image using the discriminator and the correct answer label associated with the image.

The method by which the second update means 50 calculates the degree of divergence (error) is the same as the method by which the first update means 40 calculates the degree of divergence (error). The method of updating the discriminator is determined depending on the discriminator used. For example, in the case where the discriminator is a neural network, the second update means 50 may learn such parameters that minimize the degree of divergence using, as learning data, the second output set output from the discrimination means 30.

The method by which the second update means 50 learns the parameters may be the same as or different from the method by which the first update means 40 learns the parameters. For example, suppose the second update means 50 updates the parameters of the discriminator based on the same method as that used by the first update means 40. Let the loss based on the learning data using the generated image be $E_1$, the loss based on the learning data using the first actual image be $E_2$, and the loss based on the learning data using the second actual image be $E_3$. Then, the second update means 50 may optimize the parameters of the discriminator so as to minimize the total sum of the three loses, that is, $E = E_1 + E_2 + E_3$.

Thus, the second update means 50 updates the discriminator so as to minimize the second error that includes the degree of divergence between the result of discriminating the generated image and the correct answer label indicating that the generated image is not the target image, the degree of divergence between the result of discriminating the first actual image and the correct answer label indicating that the first actual image is the target image, and the degree of divergence between the result of discriminating the second actual image and the correct answer label indicating that the second actual image is not the target image.

The image generation means 20, the discrimination means 30, the first update means 40, and the second update means 50 are realized by a CPU in a computer operating according to a program (image generation program). For example, the program may be stored in the storage unit 10 in the image generation device 100, with the CPU reading the program and, according to the program, operating as the image generation means 20, the discrimination means 30, the first update means 40, and the second update means 50. Alternatively, the image generation means 20, the discrimination means 30, the first update means 40, and the second update means 50 may each be realized by dedicated hardware.

Figure 3:
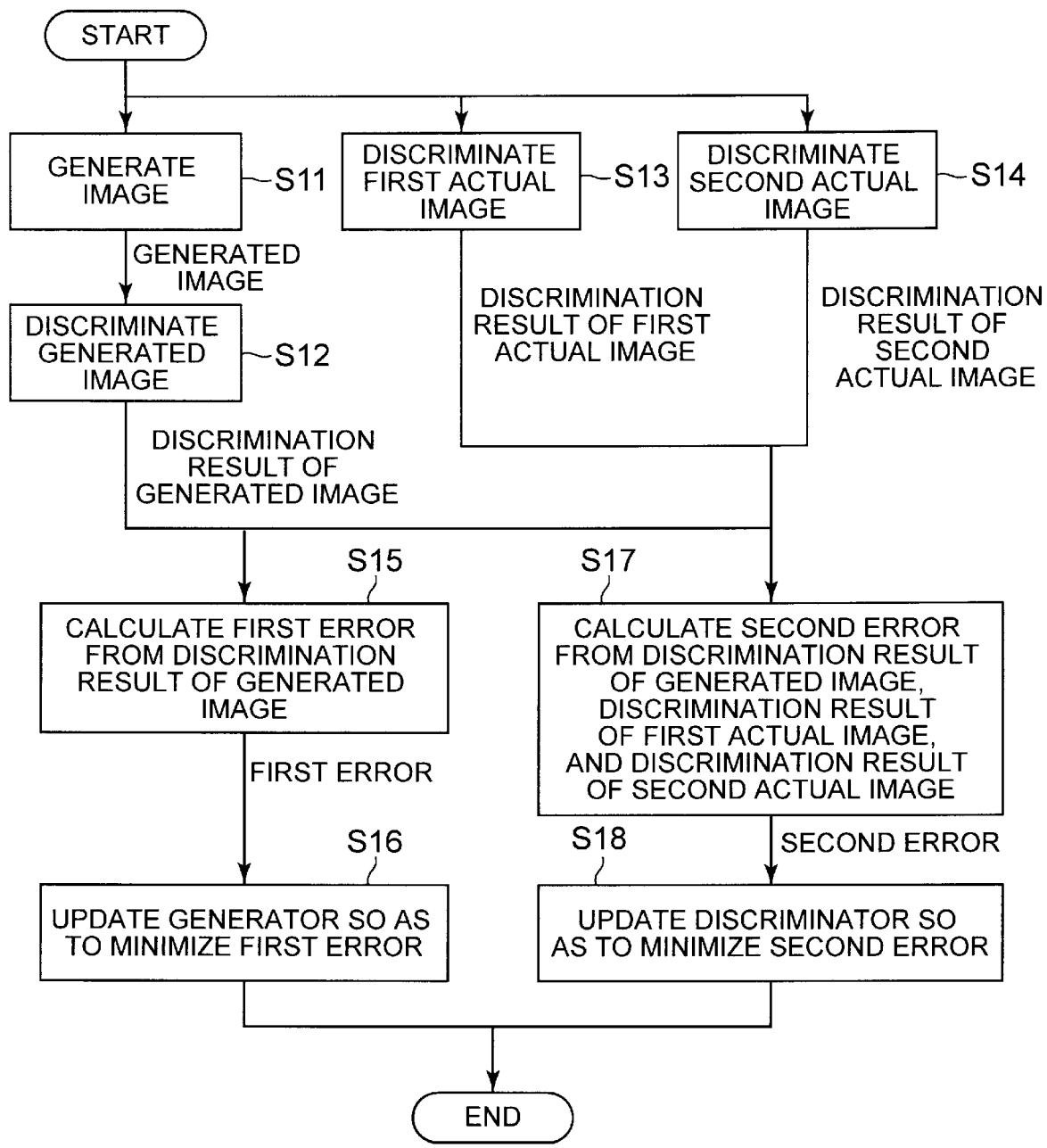
FIG. 3 is a flowchart depicting an example of operation of the image generation device.

Operation of the image generation device 100 according to this exemplary embodiment will be described below. FIG. 3 is a flowchart depicting an example of the operation of the image generation device 100 according to this exemplary embodiment.

The image generation means 20 generates an image using the generator (step S11). The discrimination means 30 then discriminates whether the generated image is the target image (step S12). Likewise, the discrimination means 30 discriminates whether the first actual image is the target image (step S13), and discriminates whether the second actual image is the target image (step S14). The processes in steps S11 and S12, the process in step S13, and the process in step S14 may be performed in parallel.

The first update means 40 calculates the first error from the discrimination result of the generated image (step S15). The first update means 40 then updates the generator so as to minimize the first error (step S16).

The second update means 50 calculates the second error from the discrimination result of the generated image, the discrimination result of the first actual image, and the discrimination result of the second actual image (step S17). The second update means 50 then updates the discriminator so as to minimize the second error (step S18). The processes in steps S15 and S16, the process in step S17, and the process in step S18 may be performed in parallel.

As described above, in this exemplary embodiment, the image generation means 20 generates an image using the generator, and the discrimination means 30 discriminates whether an object image includes the feature of the target image using the discriminator. The first update means 40 updates the generator so as to minimize the first error representing the degree of divergence between the result of discriminating the generated image using the discriminator and the correct answer label associated with the generated image. The second update means 50 updates the discriminator so as to minimize the second error representing the degree of divergence between each of the respective results of discriminating the generated image, the first actual image, and the second actual image using the discriminator and the correct answer label associated with the image.

Thus, learning image that improves image recognition accuracy can be generated. That is, in this exemplary embodiment, the generator is updated to be able to generate the target image, so that a larger number of appropriate target images can be generated as learning images.

EXAMPLE

The present invention will be described below using a specific example, although the scope of the present invention is not limited to the following example. In this example, using the number "7" as the target image, the learning of the generator using only the first actual image and the learning of the discriminator and the generator using the first and second actual images were performed, and the generated images were compared.

Figure 4:
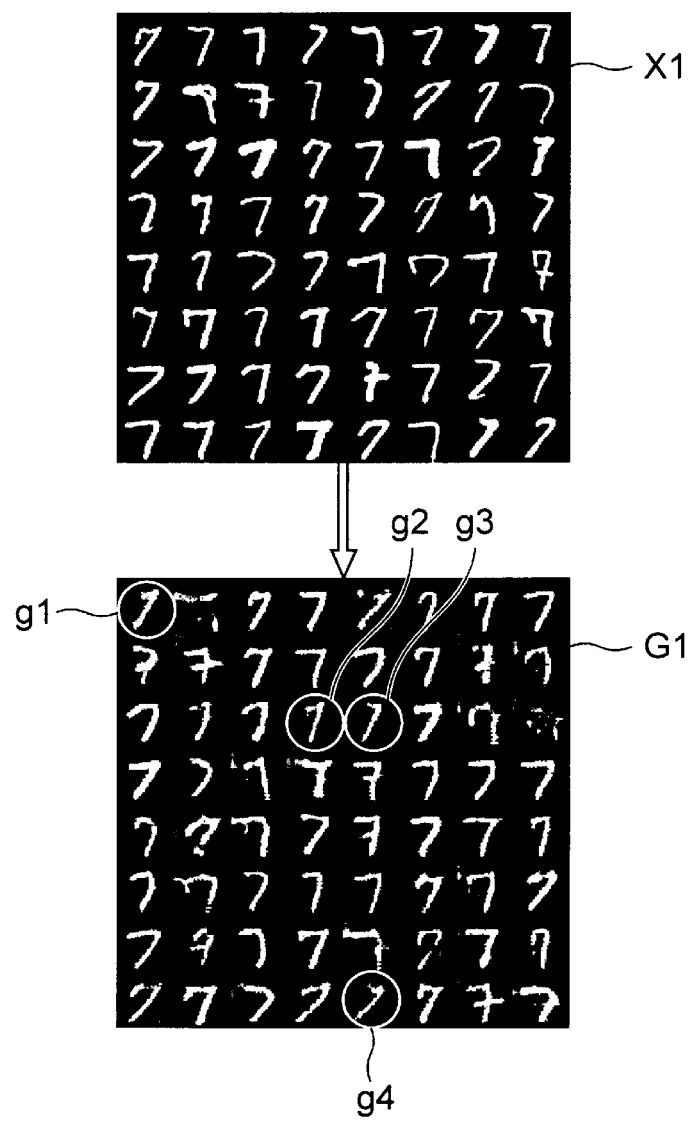
FIG. 4 is an explanatory diagram depicting an example of a generated image in the case of using a first actual image as learning data.
Figure 5:
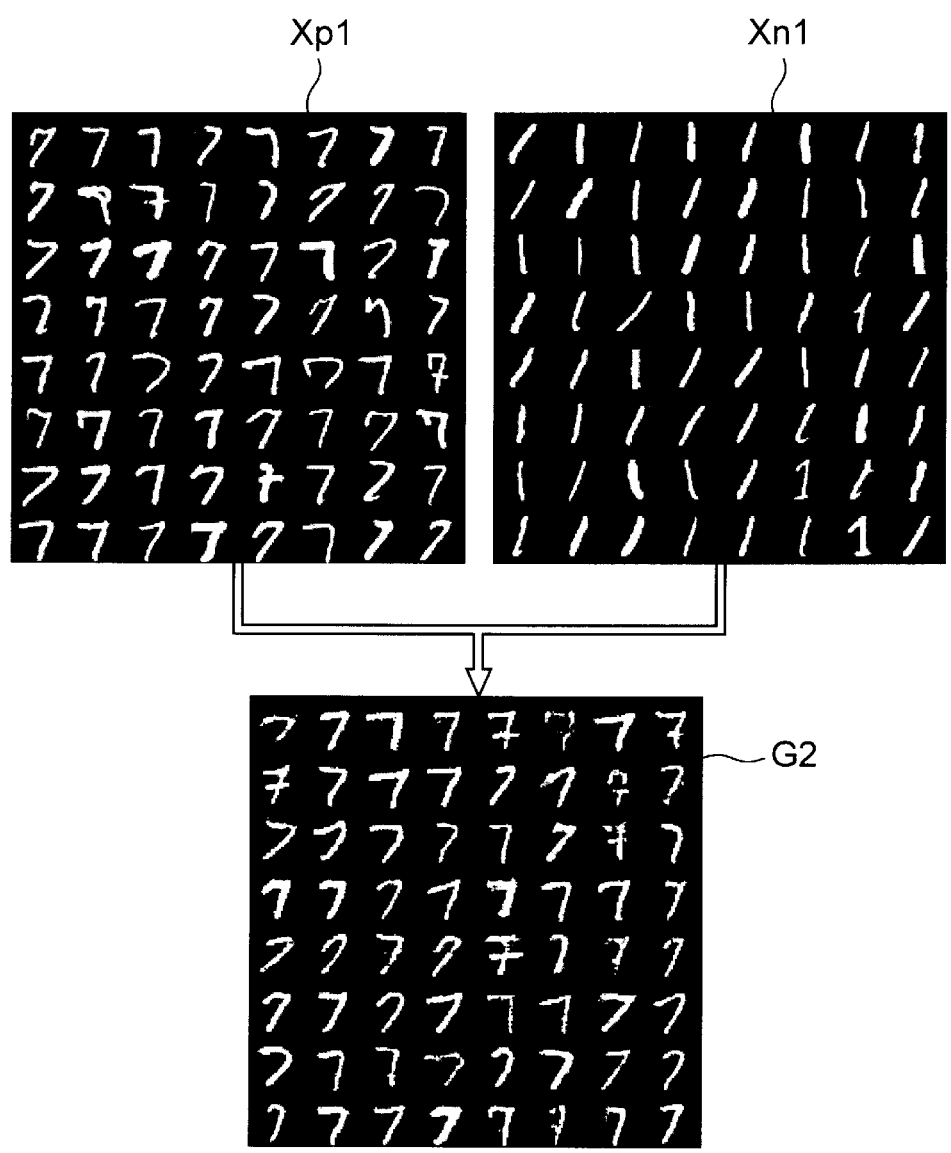
FIG. 5 is an explanatory diagram depicting an example of a generated image in the case of using the first actual image and a second actual image as learning data.

FIG. 4 is an explanatory diagram depicting an example of an image generated as a result of learning the generator using only the first actual image. FIG. 5 is an explanatory diagram depicting an example of an image generated as a result of learning the generator using the first and second actual images.

In the example depicted in FIG. 4, an image X1 including the number "7" was prepared as the first actual image. As a result of learning the generator using the image X1, an image G1 is generated. In the generated image G1, images g1 to g4 were similar to the number "1".

In the example depicted in FIG. 5, an image Xp1 including the number "7" was prepared as the first actual image, and an image Xn1 including the number "1" was prepared as the second actual image. As a result of learning the generator and the discriminator using the images Xp1 and Xn1, an image G2 was generated. In this example, the image including the number "1" was used as the second actual image, as a result of which the generation of an image similar to the number "1" was prevented and an image including the number "7" was generated as a whole.

Figure 6:
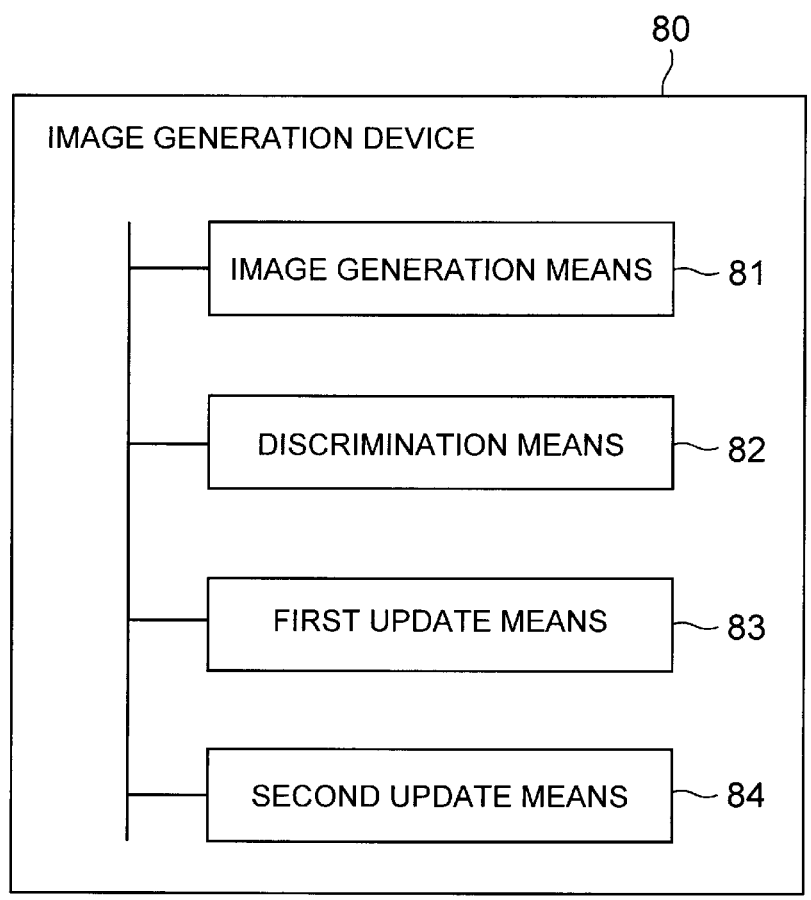
FIG. 6 is a block diagram depicting an overview of an image generation device according to the present invention.

An overview of the present invention will be described below. FIG. 6 is a block diagram depicting an overview of an image generation device according to the present invention. An image generation device 80 according to the present invention (e.g. image generation device 100) includes: an image generation means 81 (e.g. image generation means 20) for generating an image using a generator; a discrimination means 82 (e.g. discrimination means 30) for discriminating whether an object image includes a feature of a target image, using a discriminator; a first update means 83 (e.g. first update means 40) for updating the generator so as to minimize a first error representing a degree of divergence between a result of discriminating a generated image using the discriminator and a correct answer label associated with the generated image, the generated image being the image generated using the generator; and a second update means 84 (e.g. second update means 50) for updating the discriminator so as to minimize a second error representing a degree of divergence between each of respective results of discriminating the generated image, a first actual image including the feature of the target image, and a second actual image not including the feature of the target image using the discriminator and a correct answer label associated with a corresponding image.

With such a structure, a generator capable of generating a target image can be learned, so that a learning image that improves image recognition accuracy can be generated.

The second update means 84 may update the discriminator so as to minimize the second error that includes a degree of divergence between the result of discriminating the generated image and a correct answer label indicating that the generated image is not the target image, a degree of divergence between the result of discriminating the first actual image and a correct answer label indicating that the first actual image is the target image, and a degree of divergence between the result of discriminating the second actual image and a correct answer label indicating that the second actual image is not the target image.

The first update means 83 may update the generator so as to minimize the first error representing the degree of divergence between the result of discriminating the generated image and a correct answer label indicating that the generated image is the target image.

The discrimination means 82 may output a correct answer label corresponding to the object image, together with a result of discriminating the object image, the first update means 83 may update the generator so as to minimize the first error between the result of discriminating the generated image and an output correct answer label, and the second update means 84 may update the discriminator so as to minimize the second error that includes a degree of divergence between the result of discriminating the generated image and an output correct answer label, a degree of divergence between the result of discriminating the first actual image and an output correct answer label, and a degree of divergence between the result of discriminating the second actual image and an output correct answer label.

The discrimination means 82 may: output the result of discriminating the generated image and a correct answer label indicating that the generated image is not the target image, in the case where the object image is the generated image; output the result of discriminating the first actual image and a correct answer label indicating that the first actual image is the target image, in the case where the object image is the first actual image; and output the result of discriminating the second actual image and a correct answer label indicating that the second actual image is not the target image, in the case where the object image is the second actual image, and the second update means 84 may update the discriminator so as to minimize the second error that includes a degree of divergence between the result of discriminating the generated image and the correct answer label, a degree of divergence between the result of discriminating the first actual image and the correct answer label, and a degree of divergence between the result of discriminating the second actual image and the correct answer label.

The discrimination means 82 may output the result of discriminating the generated image and a correct answer label indicating that the generated image is not the target image, in the case where the object image is the generated image, and the first update means 83 may update the generator so as to minimize the first error between the result of discriminating the generated image and the correct answer label.

REFERENCE SIGNS LIST 10 storage unit
11, 11a first actual image
12, 12a second actual image
13a noise
20 image generation means
20a generator
30 discrimination means
30a discriminator
40 first update means
50 second update means
100 image generation device
D1, D2 learning data
X1, Xp1 first actual image
Xn1 second actual image
G1, G2 generated image

The invention claimed is:

1. An image generation device comprising a hardware processor configured to execute software code to:
  generate an image using a generator;
  discriminate whether an object image includes a feature of a target image, using a discriminator;
  discriminate the generated image, using the discriminator, yielding a first result;
  discriminate a first actual image that includes the feature of the target image, using the discriminator, yielding a second result;
  discriminate a second actual image that does not include the feature of the target image, using the discriminator, yielding a third result;
  update the generator so as to minimize a first error representing a first degree of divergence between the first result and a first correct answer label associated with the generated image and indicating that the generated image is not the target image;

update the discriminator so as to minimize a second error representing a second degree of divergence between the first result and the first correct answer label, between the second result and a second correct answer label associated with the first actual image and indicating that the first actual image is the target image, and between the third result and a third correct answer label associated with the second actual image and indicating that the second actual image is not the target image;

output the first result and the first correct answer label, in a first case in which the object image is the generated image;

output the second result and the second correct answer label in a second case in which the object image is the first actual image; and output the third result and the third correct answer label, in a third case in which the object image is the second actual image.

2. The image generation device according to claim 1, wherein the hardware processor is configured to execute the software code to update the generator so as to minimize the first error representing the first degree of divergence in the first case in which the object image is the generated image.

3. The image generation device according to claim 1, wherein the hardware processor is configured to execute the software code to:

update the generator so as to minimize the first error between the first result and a correct answer that is the first correct answer in the first case, the second correct answer in the second case, and the third correct answer in the third case; and update the discriminator so as to minimize the second error between each of the first result, the second result, and the third result and the correct answer that is the first correct answer in the first case, the second correct answer in the second case, and the third correct answer in the third case.

4. The image generation device according to claim 1, wherein the hardware processor is configured to execute the software code:

output 0 as the first correct answer label in the first case;
output 1 as the second correct answer label in the second case; and
output 0 as the third correct answer label in the third case.

5. An image generation method comprising:

generating an image using a generator;
discriminating whether an object image includes a feature of a target image, using a discriminator;
discriminating the generated image, using the discriminator, yielding a first result;
discriminating a first actual image that includes the feature of the target image, using the discriminator, yielding a second result;
discriminating a second actual image that does not include the feature of the target image, using the discriminator, yielding a third result;
updating the generator so as to minimize a first error representing a first degree of divergence between the first result and a first correct answer label associated with the generated image and indicating that the generated image is not the target image;

updating the discriminator so as to minimize a second error representing a second degree of divergence between the first result and the first correct answer label, between the second result and a second correct answer label associated with the first actual image and indicating that the first actual image is the target image, and between the third result and a third correct answer label associated with the second actual image and indicating that the second actual image is not the target image;

outputting the first result and the first correct answer label, in a first case in which the object image is the generated image;

outputting the second result and the second correct answer label in a second case in which the object image is the first actual image; and outputting the third result and the third correct answer label, in a third case in which the object image is the second actual image.

6. A non-transitory computer readable information recording medium storing an image generation program, when executed by a processor, that performs a method for:

generating an image using a generator;
discriminating whether an object image includes a feature of a target image, using a discriminator;
discriminating the generated image, using the discriminator, yielding a first result;
discriminating a first actual image that includes the feature of the target image, using the discriminator, yielding a second result;
discriminating a second actual image that does not include the feature of the target image, using the discriminator, yielding a third result;
updating the generator so as to minimize a first error representing a first degree of divergence between the first result and a first correct answer label associated with the generated image and indicating that the generated image is not the target image;
updating the discriminator so as to minimize a second error representing a second degree of divergence between the first result and the first correct answer label, between the second result and a second correct answer label associated with the first actual image and indicating that the first actual image is the target image, and between the third result and a third correct answer label associated with the second actual image and indicating that the second actual image is not the target image;
outputting the first result and the first correct answer label, in a first case in which an object image is the generated image;
outputting the second result and the second correct answer label in a second case in which the object image is the first actual image; and
outputting the third result and the third correct answer label, in a third case in which the object image is the second actual image.

* * * * *